United States Patent [19]
Hellén et al.

[11] Patent Number: 5,647,316
[45] Date of Patent: Jul. 15, 1997

[54] INJECTION ARRANGEMENT FOR AN INTERNAL COMBUSTION ENGINE

[75] Inventors: Göran Hellén, Vaasa; Dave Jay, Vähäkyrö, both of Finland

[73] Assignee: Wartsila Diesel International Ltd Oy, Helsinki, Finland

[21] Appl. No.: 557,448

[22] Filed: Nov. 14, 1995

[30] Foreign Application Priority Data

Dec. 23, 1994 [FI] Finland ..................... 946051

[51] Int. Cl.$^6$ .............. F02B 3/00; F02B 47/02; F02M 43/04
[52] U.S. Cl. ................. 123/299; 123/444; 123/256
[58] Field of Search ................. 123/25 C, 444, 123/25 E, 25 Q, 299, 304

[56] References Cited

U.S. PATENT DOCUMENTS

| | | | |
|---|---|---|---|
| 4,499,861 | 2/1985 | Wiegand et al. | 123/304 |
| 4,856,713 | 8/1989 | Burnett. | |
| 5,170,751 | 12/1992 | Tosa et al. | 123/25 C |
| 5,174,247 | 12/1992 | Tosa et al. | 123/25 C |
| 5,245,953 | 9/1993 | Shimada et al. | 123/25 C |
| 5,529,094 | 6/1996 | Wirbeleit et al. | 123/25 C |

FOREIGN PATENT DOCUMENTS

| | | |
|---|---|---|
| 0610585 | 8/1994 | European Pat. Off. . |
| 249339 | 7/1912 | Germany . |
| 288052 | 10/1915 | Germany . |
| 293262 | 7/1916 | Germany . |
| 495998 | 4/1930 | Germany . |
| 598918 | 6/1934 | Germany . |
| 668115 | 11/1938 | Germany . |
| 850251 | 9/1952 | Germany . |
| 925139 | 3/1955 | Germany . |
| 3540780 | 5/1987 | Germany . |
| 5288129 | 11/1993 | Japan . |
| 6288316 | 10/1994 | Japan ..................... 123/304 |
| 2130650 | 6/1984 | United Kingdom . |

Primary Examiner—Erick R. Solis
Attorney, Agent, or Firm—Smith-Hill and Bedell

[57] ABSTRACT

An injection arrangement for an internal combustion engine, especially a diesel engine, for injecting different pressure mediums directly into a cylinder of the engine, which arrangement includes a first valve (3), which is arranged to inject fuel, and a second (4) valve, which is arranged to inject an additional medium, by means of which the content of noxious substances resulting from burning of the fuel can be decreased. Said second valve (4) comprises an elongated valve member (5) movable within a valve body (2) against the force of a spring (12) and in association with the part of which located on the cylinder side there is arranged a chamber (6), which encircles the valve member (5) and into which said additional medium is arranged to be fed continuously under pressure. Said chamber (6) is limited at its end away from the cylinder to a step made in the valve member (5) and serving as a piston surface (7) and being so dimensioned that the mere pressure of the additional medium fed into the chamber (6) is not sufficient as such in order to open the valve (4) for effecting injection. In addition the arrangement comprises a control valve (27) controlled by an electric signal (35) and which, under the influence of the control signal (35), is arranged to effect, together with the pressure of the additional medium acting on the said piston surface (7) in the valve member (5), movement of the valve member (5) into a position opening the valve (4) for injection of the additional medium into the cylinder.

19 Claims, 1 Drawing Sheet

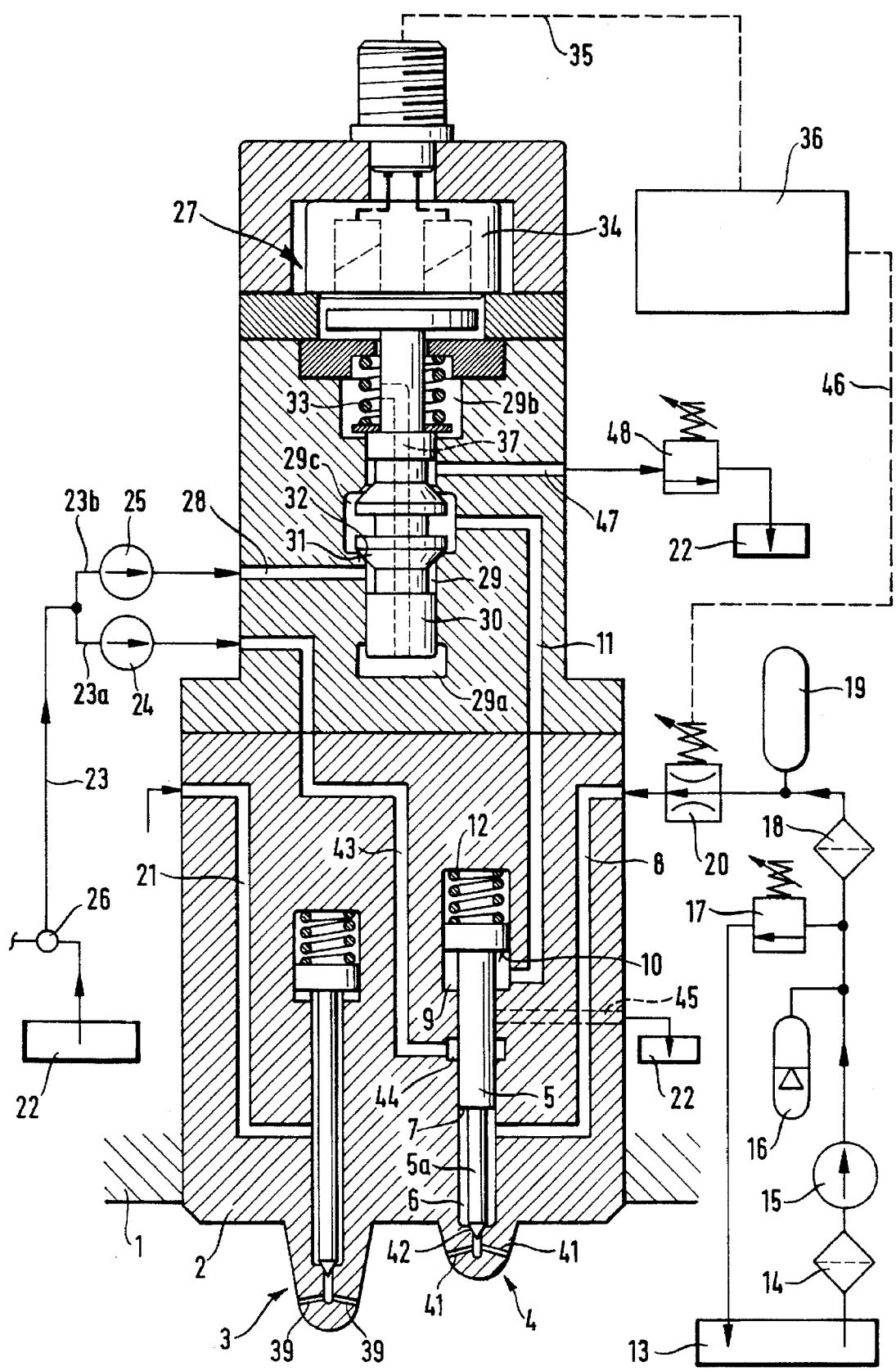

INJECTION ARRANGEMENT FOR AN INTERNAL COMBUSTION ENGINE

The invention relates to an injection arrangement for an internal combustion engine, especially a diesel engine, for injecting different pressure mediums directly into a cylinder of the engine, which arrangement includes a first valve, which is arranged to inject fuel, and a second valve, which is arranged to inject an additional medium, by means of which the content of noxious substances resulting from burning of the fuel can be decreased. The invention relates also to a method for making use of the injection arrangement.

In a cylinder of especially a diesel engine there are created under high temperatures nitrogen oxides, NOx, which leave together with the exhaust gases into open air. Due to negative environmental effects of the nitrogen oxide emissions there is an endeavor to minimize them. In practice this is carried out so that an attempt is made to influence the burning phenomenon in the engine or the exhaust gases are depurated.

The methods relating to engine technique are based on an attempt to minimize the creation of nitrogen oxides or an attempt to reduce the nitrogen oxides in the actual combustion or burning chamber of an engine cylinder. Such methods are for instance shifting of the advance for the injection of fuel, injection of an additional medium directly into the cylinder etc. Hereby nitrogen oxide emissions can typically be decreased by 10–70%. From the viewpoint of investments on equipment the methods relating to engine technique are advantageous.

Known internal methods for the engine are based on the fact that the burning process and/or the products thereof are treated already in the engine cylinder by feeding, in addition to the actual fuel, some medium into the cylinder reacting with the mixture and/or cooling it, whereby the content of nitrogen oxides, NOx, in the exhaust gases from the process can essentially be decreased by means of the provided chemical reaction and/or cooling.

The additional medium to be fed can thus be reduction medium, especially ammonium or urea. Some solution, especially water, is with advantage mixed with the additional medium so that an even distribution of the reduction medium and of the drops of the solution is accomplished for making the chemical reduction process of the nitrogen oxides to be created in the burning chamber of the cylinder more effective. The additional medium to be fed can alternatively be also water, whereby the effect of decreasing the nitrogen oxide content is based on cooling of the burning mixture.

An aim of the invention is to provide an improved injection arrangement, and a method making use of it, especially for diesel engines, which has an uncomplicated construction and is secure as to operation and provides good possibilities for the selection of the exact moment of injection and the duration thereof and for any changes thereof according to need so that the content of different nitrogen oxides created in the burning process can further be decreased from the exhaust gases.

According to the invention said second valve comprises an elongated valve member movable within a valve body against the force of a spring and in association with the part of which located on the cylinder side there is arranged a chamber, which encircles the valve member and into which said additional medium is arranged to be fed continuously under pressure. Said chamber is limited at its end away from the cylinder to a step made in the valve member and serving as a piston surface and being so dimensioned that the mere pressure of the additional medium fed into the chamber is not sufficient as such in order to open the valve for effecting injection. In addition the arrangement comprises a control valve controlled by an electric signal and which, under the influence of the control signal, is arranged to effect, together with the pressure of the additional medium acting on the said piston surface in the valve member, movement of the valve member into a position opening the valve for injection of the additional medium into the cylinder. By keeping the circuit for the additional medium continuously connected directly with the feeding chamber of the valve, an uncomplicated construction in the actual valve body and an advantageous operation of the valve is obtained. Injection of the additional medium can be accomplished precisely and flexibly according to need, because it is dependent on an electric control signal.

The control valve is with advantage a solenoid valve, which receives the electric signal from an electronic control unit dependent on the operation of the engine and being programmed in advance preferably so that the start and the duration of a feeding period occur by taking account of the load and the number of revolutions of the engine in each case. Hereby possible changes for minimizing of the content of nitrogen oxides according to the situation can be taken account of precisely and flexibly.

In practice the solenoid valve can be arranged to control feeding of a hydraulic fluid into a second chamber arranged in connection with a second piston surface arranged on the valve member, whereby the direction of operation is the same for both the piston surfaces.

A circuit for the hydraulic fluid includes further a branch provided with a separate feeding pump and connected to a sealing groove which is limited to the mantle surface of the valve member located between the said two piston surfaces. Hereby in addition to controlling the valve the same hydraulic fluid can be used for sealing the valve member, and notwithstanding, different pressures can be used in the different branches so that the sealing pressure exceeds the pressures prevailing in both the pressure medium chambers.

A feeding circuit for the additional medium includes flow control means arranged to detect changes in the flow pressure and, as a result thereof, when necessary, to act on the flow, for instance to cut off feeding of the additional medium into said first chamber, in case the feeding into the cylinder exceeds the set time limits. This can occur for example in case the valve member does not close entirely, but is jammed for instance.

Even distribution of the additional medium can be forwarded, in case the nozzle orifices in the valves are mutually arranged on different level. In addition both the valves can be arranged within the same valve body, which provides a compact and strong construction.

An injection arrangement according to the invention, in which fuel and an additional medium decreasing the content of noxious substances resulting from burning of the fuel are fed through separate valves into a cylinder of an engine, can with advantage be made use of so that feeding of the additional medium into a feeding chamber for the additional medium in association with the valve member of the additional medium valve takes place under a pressure of above 250 bar, preferably at least 400 bar, so that the resulting force effect on the valve member, however, remains below a spring force provided for closing the valve, that the start of the injection is determined by feeding hydraulic fluid under pressure, preferably 250 . . . 300 bar, into a hydraulic fluid chamber effecting on the valve member, and that feeding of the additional fluid occurs partly concurrently with feeding of the fuel and is stopped by cutting off the feeding of the hydraulic fluid into said hydraulic fluid chamber. Thus, feeding of the additional medium occurs continuously and partly simultaneously with the feeding of the fuel.

In case the additional medium is water the feeding thereof is started before starting of the feeding of fuel and is stopped after feeding of the fuel is started. Correspondingly in case the additional medium is ammonium, urea or a water solution of these, the feeding thereof is started after starting of the feeding of fuel, preferably after ignition of the actual fuel, and the feeding thereof is stopped only after feeding of the fuel is stopped.

Utilization of the injection arrangement in a way according to the invention is based on an experimentally perceived phenomenon that when it is attempted to merely minimize the contents of nitrogen oxides by utilizing different ways of feeding, the fuel consumption, however, can in certain phase begin to increase substantially at the same time. In the way according to the invention, however, the nitrogen oxides created in the burning process can be decreased effectively and at the same time the fuel consumption can be kept reasonable.

BRIEF DESCRIPTION OF THE DRAWING

In the following the invention is described, by way of example, with reference to the attached drawing, the sole figure of which shows schematically an embodiment of an injection arrangement according to the invention.

In the drawing 1 indicates a cylinder head of an engine by which a burning chamber of a cylinder (not-shown) is limited and which supports a valve body 2 including a valve 3 for injecting fuel and a valve 4 for injecting an additional medium, for instance water. The valve 3 is by means of a passage 21 in connection with an injection pump (not-shown), which feeds fuel to be injected through the valve 3 and nozzle orifices 39 into the burning chamber in a way known as such, so it is not described more clearly here.

The valve 4 to be used for feeding the additional medium includes a valve member 5 with a needle part 5a, which actually controls feeding of the additional medium through nozzle orifices 41 into the burning chamber of the engine cylinder. In association with the needle part 5a there is a chamber 6 for the additional medium, which is limited at its upper part to a step made in the valve member 5 and serving as a piston surface 7. The additional medium is fed into the chamber 6 under pressure through a passage 8. The valve member 5 includes also a second piston surface 10, by which a second pressure medium chamber 9 is limited. Hydraulic fluid is fed into the second chamber 9 through a passage 11 as will be described below. A spring 12 urges the valve member 5 against a seat surface 42 in the valve body 2 and, thus, keeps the valve 4 normally closed.

A circuit for feeding the additional medium includes a container 13 from which a pump 15 pumps additional medium through filters 14 and 18 to be further fed into the passage 8. The circuit includes also damper means 16, known as such and decreasing pressure fluctuations, pressure adjusting means 17 and a pressure accumulator 19, which ensures that the pressure may not fall too much during feeding.

In addition the circuit includes a so called flow-fuse 20, which detects changes in the flow pressure and influences on the flow according to need. Especially in case feeding of the additional medium into the cylinder through the valve 4 exceeds the set time limits, for instance 10 ms, the flow-fuse 20 can be arranged to cut off the feeding by means of a control signal 46 as will be described below. A reason for a valve to remain open in this way can be for instance jamming of the valve member so that the valve does not close properly. On the other hand when the injection starts the pressure tends to fall, whereby the flow-fuse 20 can be arranged to provide a pressure pulse to prevent the pressure from falling for instance more than 30 bar from the desired injection pressure.

In practice the operation of the flow-fuse 20 can with advantage be based on a piston member, through which the additional medium flow is led and which is pressed against the force of a spring by the flow. Then the flow-fuse can be provided with a sensor, which detects the movements resulting from the changes in the flow and in accordance therewith provides the above mentioned control signal 46 when needed.

The hydraulic fluid fed into the chamber 9 can with advantage be engine oil, which is pumped from an oil container 22 in the engine through a branching 26 along a pipe 23, which is bifurcated into a sealing fluid branch 23a and a control fluid branch 23b, which are provided with pumps 24 and 25 respectively. When needed the feeding circuit for the hydraulic fluid can also be provided for instance with pressure adjusting means and damper means quite as is the case with the feeding circuit for the additional medium. Through the sealing fluid branch 23a the hydraulic fluid is fed via a passage 43 into a sealing groove 44 encircling the valve member 5. Excess fluid is recovered through a drain passage 45 and is led through a filter (not-shown) back into the container 22. The pressure of the hydraulic fluid supplied to the seating groove 44 is selected so that it slightly exceeds the pressure of the additional medium in the chamber 6 and thus prevents the different pressure mediums in the chambers 6 and 9 from being mixed with each other. If for instance the pressure of the additional medium in the chamber 6 is about 400 bar, the pressure of the hydraulic fluid can with advantage be for instance 430 bar.

The control fluid branch 23b is connected through a passage 28 with a chamber 29 in the valve body 2. The chamber 29 includes a control valve 27 with a valve member 30 movable against the force of a spring 33. The chamber 29 is formed to include extension parts 29a, 29b and 29c, whereby the parts 29a and 29b are in connection with each other through a passage 37 and the part 29c is in connection with the pressure medium chamber 9 through the passage 11. Normally the spring 33 presses a valve surface 31 in the valve member 30 against a seat surface 32 in the valve body 2 and thereby prevents feeding of hydraulic fluid from the passage 28 through the chambers 29 and 29c into the passage 11. Control of the valve member 30 is carried out by means of a solenoid arrangement 34 included in the control valve 27 and receiving a control signal 35 from an electronic control unit 36. The control unit 36 can be preprogrammed in a way known as such to provide control signals timely in accordance with the operation cycle of the engine, for instance on the basis of signals from a detector following the rotation of the cam shaft of the engine. In addition changes in the load and in the number of revolutions of the engine can be taken account of in the programming and thus the timing of a feeding period and the duration thereof can be changed. The control unit 36 may also be programmed so that when the engine is idling it provides no control signal 35 at all, whereby no additional medium is injected either. In a corresponding way the control unit may be programmed to cut off the injection when needed on the basis of the sensor signal 46 from the flow-fuse 20 as described above.

An excess hydraulic fluid fed through the control fluid branch 23b is led back into the container 22 through a passage 47 and pressure adjusting means 48. A part of this hydraulic fluid, however, can be recovered also through the drain passage 45.

The operation of the feeding valve 4 for the additional medium is as follows. Normally, prior to feeding, the pump 15 feeds continuously additional medium through the passage 8 into the chamber 6, whereby the pressure in the chamber 6 is for instance about 400 bar. The force of the spring 12 is selected so that when the control valve 27 is in its closed position the pressure in the chamber 6 together with the pressure of the hydraulic fluid in the chamber 9, however, is not sufficient to open the valve. Under the influence of the control signal 35 from the electronic control unit 36 the solenoid arrangement 34 causes the valve member 30 of the Control valve 27 to move against the force of the spring 33 upwards in the figure so that the connection of the passage 28 through the chamber 29 and its extension 29c to the passage 11 is opened. Then the pressure of the hydraulic fluid to be fed, which may be for instance 300 bar, can act on the piston surface 10 in the chamber 9, as a result of which the force on the valve member 5 due to the pressure in the chambers 6 and 9 jointly exceeds the force of the spring 12 and causes opening of the valve 4, whereby injection of the additional medium is carried out through the nozzle orifices 41 into the burning chamber of the cylinder.

Hence, the control unit 36 determines the timing and duration for the injection of the additional medium. Especially with regard to the feeding of fuel through the valve 3 it can be notified that when the additional medium is water the valve 4 is opened prior to the valve 3, and after opening of the valve 3 the valve 4 remains open so that the two valves are concurrently open for some time. In case the additional medium is ammonia, urea or a water solution of these, feeding of the additional medium is started only after the valve 3 is opened. In this case the valve 4 is preferably closed only after the fuel injection through the valve 3 has been stopped.

Closing of the valve 4 takes place under the influence of the control unit 36 so that the solenoid arrangement 34 releases the valve member 30, which, urged by the spring 33, is pressed into a position in which the valve surfaces 31 and 32 together prevent feeding of the hydraulic fluid from the passage 28 into the passage 11, whereby the hydraulic fluid is allowed into the passage 47 and the pressure in the chamber 9 decreases. As a result thereof the spring 12 urges the valve member 5 into its closing position.

In practice and depending on the application the feeding pressure for the additional medium may be for instance 250 . . . 600 bar. Even at its lowest the pressure must clearly exceed the pressure in the burning chamber of the cylinder. An upper limit for its part depends on the spring force of the spring 12 closing the valve member 5 so that the spring 12 must be able to close the feeding valve 4 for the additional medium, when additionally taking account of the pressure of the hydraulic fluid in the chamber 9, which after closing of the control valve 27 can be about 20 bar. In addition, naturally, the area of the second piston surface 10 of the valve member 5 affects the matter. The pressures in the hydraulic fluid branches 23a and 23b are selected in accordance with the pressures in said feeding circuit for the additional medium so that the pressure in the sealing fluid branch 23a slightly exceeds said pressure, for instance by about 30 bar, and the pressure in the control fluid branch 23b is sufficient so that when fed into the chamber 9 it together with the pressure of the additional medium in the chamber 6 exceeds the force of the spring 12 enabling opening of the valve 4 so as to provide injection of the additional fluid. Instead of hydraulic fluid the control of the valve 4 may alternatively be based on a mechanical connection between the valve members 5 and 30 transmitting the control movements of the control valve 27 to the valve member 5.

The invention is not limited to the embodiments shown or described, but several modifications are feasible within the scope of the attached claims.

We claim:

1. An injection arrangement for an internal combustion engine, especially a diesel engine, for injecting different pressure mediums directly into a cylinder of the engine, which arrangement includes a first valve (3), which is arranged to inject fuel, and a second (4) valve, which is arranged to inject an additional medium, by means of which the content of noxious substances resulting from burning of the fuel can be decreased, said second valve (4) comprising an elongated valve member (5) movable within a valve body (2) against the force of a spring (12) and in association with a part of which located on the cylinder side there is arranged a chamber (6), which encircles the valve member (5) and into which said additional medium is arranged to be fed continuously under pressure, said chamber (6) being limited at its end away from the cylinder to a step made in the valve member (5) and serving as a piston surface (7) and being so dimensioned that the mere pressure of the additional medium fed into the chamber (6) is not sufficient as such in order to open the valve (4) for effecting injection, and the arrangement further comprising a control valve (27) controlled by an electric signal (35) and which, under the influence of the control signal (35), is arranged to effect, together with the pressure of the additional medium acting on the said piston surface (7) in the valve member (5), movement of the valve member (5) into a position opening the valve (4) for injection of the additional medium into the cylinder.

2. An injection arrangement for an internal combustion engine, for injecting at least first and second pressure mediums directly into a cylinder of the engine, including:

a first valve for injecting a fuel as said first pressure medium into the cylinder for burning therein and producing combustion products, a second valve for injecting said second pressure medium into the cylinder, the second pressure medium reducing concentration of noxious substances in the combustion products, said second valve comprising a valve body portion, an elongated valve member movable in the valve body portion between a closed position and an open position, and a spring urging the valve member toward said closed position, wherein the valve body portion bounds a pressure chamber through which the valve member extends and which is bounded at an end farther from the engine cylinder by a piston surface formed on the valve member, a means for supplying the second pressure medium to the pressure chamber for acting against the piston surface of the valve member and urging the valve member toward the open position with a force that is not sufficient to move the valve member to its open position against resistance of the spring, and a control member in force transmitting relationship with the valve member, the control member being responsive to an electric control signal to urge the valve member toward its open position with a force sufficient, in combination with the force with which the second pressure medium acts against the piston surface of the valve member, to move the valve member to its open position against the resistance of the spring.

3. An injection arrangement according to claim 2, wherein the control member is an armature of a solenoid valve and the arrangement further comprises an electronic control unit that provides the electric control signal to the solenoid valve dependent on operation of the engine.

4. An injection arrangement according to claim 3, wherein the electronic control unit is programmed so that the start and feeding duration of a feeding cycle are dependent on the load and number of revolutions of the engine.

5. An injection arrangement according to claim 3, wherein the valve body portion bounds a second chamber through which the valve member extends and which is bounded at an end farther from the engine cylinder by a second piston surface formed on the valve member, and the solenoid valve is connected to a duct to control feeding of hydraulic fluid into the second pressure chamber.

6. An injection arrangement according to claim 5, wherein the valve body portion bounds a sealing groove through which the valve member extends and which is between the pressure chamber and the second chamber, and the injection arrangement includes a means defining a branch duct for feeding hydraulic fluid to the sealing groove.

7. An injection arrangement according to claim 3, wherein the valve body portion bounds a second chamber through which the valve member extends and which is bounded at an end farther from the engine cylinder by a second piston surface formed on the valve member, and a sealing groove through which the valve member extends and which is between the pressure chamber and the second chamber, and the injection arrangement includes a first feeding pump for supplying hydraulic fluid to the second chamber by way of the solenoid valve and a second feeding pump for supplying hydraulic fluid to the sealing groove.

8. An injection arrangement according to claim 2, including a flow control means for detecting change in flow pressure of the second pressure medium, said flow control means being responsive to change in flow pressure for influencing flow of the second pressure medium to the second valve.

9. An injection arrangement according to claim 8, wherein the flow control means is operative to cut off feeding of the second pressure medium to the pressure chamber in the event that feeding into the cylinder exceeds a set time limit.

10. An injection arrangement according to claim 2, wherein each valve is provided with at least one valve orifice debouching into the cylinder, and the orifice of the first valve is at a different position axially of the first valve than the orifice of the second valve.

11. An injection arrangement according to claim 2, wherein the first valve comprises a valve body portion, the valve body portion of the first valve and the valve body portion of the second valve being respective portions of a common valve body.

12. An injection arrangement according to claim 2, wherein the first valve comprises a valve body portion and an elongated valve member movable in the valve body portion of the first valve between a closed position and an open position.

13. A method of operating an injection arrangement for an internal combustion engine, said injection arrangement including a first valve for injecting a fuel medium into the cylinder for burning therein and producing combustion products, a second valve for injecting a second medium into the cylinder, said second valve comprising a valve body portion, an elongated valve member movable in the valve body portion between a closed position and an open position, and a spring urging the valve member toward said closed position, wherein the valve body portion defines a pressure chamber through which the valve member extends and which is bounded at an end farther from the engine cylinder by a piston surface formed on the valve member, and a means for supplying the second pressure medium to the pressure chamber for acting against the piston surface of the valve member and urging the valve member toward the open position with a force that is not sufficient to move the valve member to its open position against resistance of the spring, said method comprising:

employing a medium for reducing concentration of noxious substances in the combustion products as the second pressure medium, providing a control member in force transmitting relationship with the valve member, and supplying an electric signal to the control member, the control member being responsive to the electric signal to urge the valve member toward its open position with a force sufficient, in combination with the force with which the second pressure medium acts against the piston surface of the valve member, to move the valve member to its open position against the resistance of the spring.

14. A method of using an injection arrangement including a first valve for injecting a fuel medium into a cylinder of an internal combustion engine for burning in the cylinder and producing combustion products, a second valve for injecting a second medium into the cylinder, said second valve comprising a valve body portion, an elongated valve member movable in the valve body portion between a closed position and an open position, and a spring urging the valve member toward said closed position, wherein the valve body portion defines an injection chamber through which the valve member extends and which is bounded at an end farther from the engine cylinder by a first piston surface formed on the valve member, and a hydraulic fluid chamber in which the valve member extends and which is bounded at an end farther from the engine cylinder by a second piston surface formed on the valve member, said method comprising:

injecting the fuel medium into the cylinder using the first valve during a fuel injection cycle, continuously supplying the second pressure medium to the injection chamber at a pressure of at least 250 bar for acting against the first piston surface of the valve member and urging the valve member toward the open position with a force that is not sufficient to move the valve member to its open position against resistance of the spring, starting an injection cycle for the second pressure medium by feeding a hydraulic fluid under pressure to the hydraulic fluid chamber, and terminating the injection cycle for the second pressure medium by cutting off feeding of hydraulic fluid to the hydraulic fluid chamber, and wherein the second pressure medium is a medium for reducing concentration of noxious substances in the combustion products and the injection cycle for the second pressure medium coincides at least partly in time with the fuel injection cycle.

15. A method according to claim 14, comprising supplying the second pressure medium to the injection chamber at a pressure of at least 400 bar.

16. A method according to claim 14, comprising feeding the hydraulic fluid into the hydraulic fluid chamber at a pressure in the range from about 250 bar to about 300 bar.

17. A method according to claim 14, wherein the second pressure medium is water and the injection cycle for the second pressure medium starts before the fuel injection cycle starts and ends after the start of the fuel injection cycle.

18. A method according to claim 14, wherein the second pressure medium is ammonia, urea or an aqueous solution of at least one of ammonia and urea and the injection cycle for the second pressure medium starts after the fuel injection cycle starts and ends after the fuel injection cycle ends.

19. A method according to claim 18, wherein the injection cycle for the second pressure medium starts after ignition of fuel in the cylinder.

* * * * *